United States Patent [19]

Ishino et al.

[11] Patent Number: 5,086,020
[45] Date of Patent: Feb. 4, 1992

[54] HIGH ZIRCONIA FUSED CAST REFRACTORY

[75] Inventors: Toshihiro Ishino, Yokohama; Kouzou Sakai, Kawasaki; Nobuyuki Kido, Kobe, all of Japan

[73] Assignee: Asahi Glass Company Ltd., Tokyo, Japan

[21] Appl. No.: 617,178

[22] Filed: Nov. 23, 1990

[30] Foreign Application Priority Data

Nov. 28, 1989 [JP] Japan .................................. 1-306455

[51] Int. Cl.$^5$ ............................................. C04B 35/48
[52] U.S. Cl. ..................................... 501/105; 501/103
[58] Field of Search ................................. 501/103, 105

[56] References Cited

U.S. PATENT DOCUMENTS

| | | | |
|---|---|---|---|
| 3,632,359 | 1/1972 | Alper et al. | 501/105 |
| 5,023,218 | 6/1991 | Zanoli et al. | 501/105 |

FOREIGN PATENT DOCUMENTS

| | | |
|---|---|---|
| 195995 | 6/1970 | Fed. Rep. of Germany . |
| 2478622 | 9/1981 | France . |
| 2587025 | 3/1987 | France . |
| 48-32408 | 10/1973 | Japan . |
| 55-3319 | 1/1980 | Japan . |
| 59-12619 | 3/1984 | Japan . |

*Primary Examiner*—Mark L. Bell
*Assistant Examiner*—C. Melissa Bonner
*Attorney, Agent, or Firm*—Oblon, Spivak, McClelland, Maier & Neustadt

[57] ABSTRACT

A high zirconia fused cast refractory having excellent thermal cycle resistance which comprises, as chemical components of the refractory, from 90 to 95% by weight of $ZrO_2$, from 3.5 to 7% by weight of $SiO_2$ and from 1 to 3% by weight of $Al_2O_3$ and which does not substantially contain any one of $P_2O_5$, $B_2O_3$ and CuO.

4 Claims, No Drawings

HIGH ZIRCONIA FUSED CAST REFRACTORY

The present invention relates to a high zirconia fused cast refractory having high corrosion resistance against molten glass. More particularly it relates to a high zirconia fused cast refractory having excellent thermal cycle resistance, which is suitable for a glass melting furnace.

Fused cast refractories are usually prepared by a method which comprises melting refractory materials comprising predetermined components by electric arc furnaces, then pouring the meltage into casting molds of prescribed shapes, and then cooling and solidifying them under thermal insulation in many cases.

Fused cast refractories are widely known as refractories having high corrosion resistance which are entirely different in the crystalline structure and the process for their preparation from fired or unfired bonded refractories.

Among such fused cast refractories, the refractories comprising $ZrO_2$ as the main component have particularly excellent corrosion resistance against molten glass. Therefore, the fused cast refractories having a large $ZrO_2$ content are widely employed for glass melting furnace.

As a high zirconia fused cast refractory, e.g. Japanese Examined Patent Publication No. 32408/1973 discloses a zirconia-alumina-silica refractory containing at least 62% by weight of $ZrO_2$. However, the refractory having the largest $ZrO_2$ content as disclosed in the Examples of the specification is at a level of 88.7% by weight. This indicates that at that time, there was no technology available for casting a fused cast refractory with a $ZrO_2$ content of 90% by weight or more.

Subsequently, high zirconia fused cast refractories containing 90% or more of $ZrO_2$ have been developed, as disclosed in Japanese Examined Patent Publications No. 3319/1980 and No. 12619/1984. Since the high zirconia fused cast refractory containing 90% or more of $ZrO_2$ presents a low blistering property together with long service life without staining glass meltage, it has established a market as a refractory for the glass melting furnace. Now, it is going to be used in the field of special or fine glass industry.

In high zirconia fused cast refractories, the majority of the refractory crystalline structure are composed of baddeleyite crystals ($ZrO_2$). Accordingly, when they are heated, they undergo a volume shrinkage at about 1150° C. due to the crystal transformation from monoclinic crystals to tetragonal crystals in accordance with the crystal transformation specific to baddeleyite crystals, and when cooled, they undergo a volume expansion at about 950° C. due to the crystal transformation from tetragonal crystals to monoclinic crystals. Therefore, such high zirconia fused cast refractories are constructed so that the volume expansion or shrinkage of the crystals due to the transformation of the baddeleyite crystals is absorbed by a matrix glass which softens in the temperature range of the crystalline phase transformation, thereby the matrix glass relaxes the stress created in the refractory and prevents cracking. However, they still have such a problem that during the temperature rise until the matrix glass softens, a part of the refractory is likely to fall off, or when the temperature of the refractory passes through the transformation temperature range of the baddeleyite crystals, the refractory gains an increase of volume. And, if the thermal cycle between 800° C. and 1250° C. is repeated many times, the remaining volume expansion accumulates (hereinafter referred to simply as remaining expansion) to cause cracking, and in an extreme case, the refractory undergoes a spalling phenomenon due to many cracks.

It is an object of the present invention to provide a high zirconia fused cast refractory having high reliability with minimum formation of stones by overcoming the above-mentioned problems such as partial falling off or poor thermal cycle resistance which the high zirconia fused cast refractory of this type used to have.

The present invention has been made to solve the above-mentioned problems and provides a high zirconia fused cast refractory which comprises, as chemical components of the refractory, from 90 to 95% by weight of $ZrO_2$, from 3.5 to 7% by weight of $SiO_2$ and from 1 to 3% by weight of $Al_2O_3$ and which does not substantially contain any one of $P_2O_5$, $B_2O_3$ and $CuO$.

Now, the present invention will be described in detail with reference to the preferred embodiments.

In a preferred embodiment of the high zirconia fused cast refractory of the present invention, the refractory contains, as its chemical components, from 3.5 to 6% by weight of $SiO_2$ and from 1.3 to 2.5% by weight of $Al_2O_3$.

In another preferred embodiment of the high zirconia fused cast refractory of the present invention, the refractory is used for melting glass.

In the chemical composition of the high zirconia fused cast refractory of the present invention, the majority i.e. at least 90% by weight is a zirconia ($ZrO_2$) component. Therefore, the refractory exhibits excellent corrosion resistance as a refractory for molten glass and at the same time does not contain such a component as $CuO$ which stains and colors glass. It is a refractory which does not form stones (defects such as foreign substances) derived from falling off or cracking of the refractory in the glass product. Further, it is a high zirconia fused cast refractory having excellent heat cycle resistance, which exhibits a very small remaining expansion even when heat cycles passing through the transformation temperature of baddeleyite crystals are exerted repeatedly during its preparation or during its use.

The high zirconia fused cast refractory of the present invention is required to comprise the chemical components within the above-mentioned ranges for the following reasons. The refractory has a structure which comprises coarse crystals of baddeleyite and a relatively small amount of matrix glass containing $Al_2O_3$ as an important component filling the spaces between the grain boundaries of the coarse baddeleyite crystals. This glass has proper softness in the temperature range of the baddeleyite crystal transformation, so that it suitably follows the expansion and shrinkage of the baddeleyite crystals while keeping the shape of the refractory. Thus, the high zirconia fused cast refractory having excellent thermal cycle resistance have been obtained.

The higher the proportion of the $ZrO_2$ component in the refractory, the better the corrosion resistance against e.g. molten glass. In this sense, the $ZrO_2$ component is at least 90% by weight. However, if it exceeds 95% by weight, the proportion of the matrix glass tends to be so small that cracking is likely to result, and it becomes difficult to obtain a fused cast refractory having no cracks by casting. The $SiO_2$ component is an essential component for forming the matrix glass, and $SiO_2$ content is required to be at least 3.5% by weight to obtain the minimum matrix glass required. However, if the content of the $SiO_2$ component is too high, the corrosion resistance tends to deteriorate. Therefore, the content is required to be at most 7% by weight, preferably at most 6% by weight. The $Al_2O_3$ component plays an important role in adjusting the relation between the temperature and the viscosity of the matrix glass, and reduces the concentration of the $ZrO_2$ component in the matrix glass. For example, when the $Al_2O_3$ component in the refractory is 0.9% by weight or less, several weight % of $ZrO_2$ is contained in the matrix glass of the refractory. Whereas, in a refractory containing 2% by weight of $Al_2O_3$, $ZrO_2$ contained in the matrix glass is at most 2% by weight. In order to control the formation of crystals of e.g. zircon in the matrix glass by utilizing this effect, the content of the $Al_2O_3$ component is required to be at least 1% by weight, and in order to maintain the viscosity of the matrix glass at a proper level in the temperature range of the baddeleyite crystal transformation, the content of the $Al_2O_3$ component is required to be at most 3% by weight. The content of the $Al_2O_3$ component is preferably from 1.3 to 2.5% by weight, whereby the thermal cycle resistance of the high zirconia fused cast refractory thereby obtained will be further improved.

If such components as $P_2O_5$ and $B_2O_3$ are incorporated to a refractory, these components will be contained primarily in the matrix glass, and the properties of the matrix glass tend to be thereby changed so that the remaining expansion of the refractory and the formation of cracks tend to be promoted. Therefore, such components should not be incorporated. However, inclusion of trace amounts of $P_2O_5$ and $B_2O_3$ which are unavoidably contained in raw materials, will not be any particular trouble. However, it is usually preferred that the content of each of such components including the CuO component be at most 0.02% by weight.

The reasons why the high zirconia fused cast refractory undergoes partial falling during the temperature rise or why it shows a remaining expansion of e.g. 1% every cycle when subjected to thermal cycles passing through the temperature range of the transformation of baddeleyite crystal, have not yet been fully understood. However, the present inventors consider that such phenomena are caused as follows.

Namely, it is considered that due to the transformation of the baddeleyite crystals and the change of the volume, cracks are formed in the baddeleyite crystals themselves, and a part of the $ZrO_2$ component dissolved in the matrix glass crystallizes as zircon crystals ($ZrO_2 \cdot SiO_2$) by the thermal treatment, which precipitate in the matrix glass, whereby the absolute amount of the matrix glass decreases, and at the same time, the viscosity of the matrix glass tends to depart from the proper viscosity range, i.e. by the presence of the zircon crystals, the viscosity of the matrix glass tends to be high and the matrix glass can not follow the expansion and shrinkage of the baddeleyite crystals, whereby the stress relaxation tends to be inadequate, and the remaining expansion and cracking tend to take place. The high zirconia fused cast refractory of the present invention contains the $Al_2O_3$ component in an amount of at least 1% by weight, whereby the $ZrO_2$ component dissolved in the matrix glass is less as compared with the conventional high zirconia fused cast refractory, and accordingly zircon crystals will not precipitate. However, if the $Al_2O_3$ component exceeds 3% by weight, the viscosity of the matrix glass itself tends to be high, and the stress relaxation tends to be inadequate and the remaining expansion and cracking tend to result. The preferred range of the $Al_2O_3$ component is from 1.3 to 2.5% by weight, particularly when a segregation of the components in the fused cast refractory tends to result, for example, when a large sized fused cast refractory is prepared by casting. However, it is believed that in a case where $P_2O_5$ or $B_2O_3$ is contained in the matrix glass, even if $Al_2O_3$ is contained in an amount of from 1 to 3% by weight, the effect of reducing the solubility of the $ZrO_2$ component in the matrix glass is damaged, and the precipitation of the zircon crystals in the matrix glass is promoted, whereby the thermal cycle resistance tends to be low. However, when an alkali component such as $Na_2O$ is incorporated 0.3% by weight or more to the high zirconia fused cast refractory having $P_2O_5$ or $B_2O_3$ added, it provides the effects of reducing the $ZrO_2$ component in the matrix glass to some extent, whereby it is possible to cast a refractory without cracks. However, it is not sufficient to reform the poor thermal cycle resistance i.e. the remaining expansion and the consequential formation of cracks. The function of the CuO component is not clear, but if the CuO component is added, the refractory will be colored, and when it is used as a refractory for melting glass, it is likely to stain and color the glass meltage, such being undesirable.

Now, the high zirconia fused cast refractory of the present invention will be described in further detail with reference to Examples. However, it should be understood that the present invention is by no means restricted by such specific Examples.

EXAMPLES

Silica-removed zircon as zirconia raw material and powders of raw materials such as $Al_2O_3$, $SiO_2$, $P_2O_5$, $B_2O_3$, etc. were mixed to obtain a batch mixture having a predetermined chemical composition. This mixture is charged into a single phase AC electric arc furnace of 500 KVA using graphite electrodes, and completely melted at a temperature of from 2200° to 2400° C. This meltage was poured into a graphite mold having an internal capacity of 200 mm × 300 mm × 700 mm which was preliminarily embedded in a Bayer's alumina powder, then cast and left to cool to a temperature around room temperature. The chemical analytical values and properties of various fused cast refractory products thereby obtained are shown in Tables 1 and 2. Among them, those shown in Table 1 are Examples of the present invention, and those shown in Table 2 are Comparative Examples.

During the fusing of such high zirconia refractory material, a part of $Na_2O$ or $SiO_2$ component sublimates. Accordingly, $Na_2O$ and $SiO_2$ component in the fused cast refractory obtained decreases as compared with the composition of the initial raw material mixture.

To evaluate the thermal cycle resistance of the obtained high zirconia fused cast refractories, test specimens having a size of 40 mm × 40 mm × 30 mm were cut out from the cast refractories, and they were put in an electric furnace and heated from room temperature to 800° C. at a rate of 300° C./hr, then from 800° C. to 1250° C. over a period of one hour, and maintained at 1250° C. for one hour. Then, they were cooled to 800° C. over a period of one hour and maintained at 800° C. for one hour. This thermal cycle between 800° C. and 1250° C. was repeated 40 times and then the specimens were cooled to room temperature, whereupon the specimens showing no cracks and having a remaining expansion of not more than 3% were evaluated to be satisfactory refractories.

freed into the glass meltage from the cracked portions of the refractory. Further, the high zirconia fused cast refractory may frequently be used at the portion of the

TABLE 1

| No. | 1 | 2 | 3 | 4 | 5 | 6 | 7 | 8 | 9 | 10 |
|---|---|---|---|---|---|---|---|---|---|---|
| Chemical components (wt %) | | | | | | | | | | |
| $ZrO_2$ | 93.1 | 92.7 | 92.8 | 92.6 | 92.6 | 92.2 | 92.2 | 91.5 | 90.0 | 93.2 |
| $Al_2O_3$ | 1.1 | 1.5 | 1.7 | 2.0 | 2.3 | 2.3 | 2.5 | 3.0 | 2.4 | 2.2 |
| $SiO_2$ | 4.7 | 4.8 | 4.6 | 4.4 | 4.3 | 4.5 | 4.4 | 4.4 | 6.9 | 3.7 |
| $Na_2O$ | 0.7 | 0.6 | 0.5 | 0.6 | 0.4 | 0.6 | 0.5 | 0.7 | 0.6 | 0.6 |
| $P_2O_5$ | — | — | — | — | — | — | — | — | — | — |
| $B_2O_3$ | — | — | — | — | — | — | — | — | — | — |
| $Fe_2O_3 + TiO_2$ | At most 0.3 | At most 0.3 | At most 0.3 | At most 0.3 | At most 0.3 | At most 0.3 | At most 0.3 | At most 0.3 | At most 0.3 | At most 0.3 |
| $MgO + CaO$ | At most 0.1 | At most 0.1 | At most 0.1 | At most 0.1 | At most 0.1 | At most 0.1 | At most 0.1 | At most 0.1 | At most 0.1 | At most 0.1 |
| Bulk density of cast product | 5.30 | 5.30 | 5.31 | 5.29 | 5.30 | 5.26 | 5.26 | 5.24 | 5.05 | 5.30 |
| Compression strength (kg/cm$^2$) | 4000 | — | 4000 | — | — | 4000 | — | — | — | — |
| Cracks in cast product | Nil | Nil | Nil | Nil | Nil | Nil | Nil | Nil | Nil | Nil |
| After thermal cycle test | | | | | | | | | | |
| Volume expansion (%) | 2.5 | 2.0 | 0 | 0 | 1 | 2 | 2 | 3.0 | 2.8 | 2.5 |
| Cracking | Nil | Nil | Nil | Nil | Nil | Nil | Nil | Nil | Nil | Nil |
| Against sheet glass meltage | | | | | | | | | | |
| Corrosion resistance index*[1] | 2.15 | 2.18 | 2.18 | 2.20 | 2.20 | 2.20 | 2.15 | 2.15 | 1.80 | 1.90 |
| Formation of stones*[2] | Nil | Nil | Nil | Nil | Nil | Nil | Nil | Nil | Nil | Nil |
| Coloring of glass*[3] | Nil | Nil | Nil | Nil | Nil | Nil | Nil | Nil | Nil | Nil |

*[1] For the determination of the corrosion resistance index, a test specimen of 15 mm × 15 mm × 50 mm was cut out from the cast product and hanged in a platinum crucible containing molten glass at 1500° C. for 48 hours, whereby the volume corrosion amount was measured, and the corrosion resistance index = the corrosion amount (mm$^3$) of No. 11 test specimen/corrosion amount (mm$^3$) of the test specimen, was obtained.
*[2] Presence or absence of stones in the glass remained in the platinum crucible in the test for the corrosion resistance index *[1] was examined.
*[3] Presence or absence of coloring of the glass remained in the platinum crucible in the test for the corrosion resistance index *[1] was examined.

TABLE 2

| No. | 11 | 12 | 13 | 14 | 15 | 16 | 17 | 18 | 19 | 20 | 21 |
|---|---|---|---|---|---|---|---|---|---|---|---|
| Chemical components (wt %) | | | | | | | | | | | |
| $ZrO_2$ | 41 | 90 | 91.6 | 93.5 | 94.1 | 94.3 | 94.0 | 93.2 | 94.2 | 95 | 90 |
| $Al_2O_3$ | 46 | 2.5 | 0.7 | 2.2 | 0.7 | 1.9 | 0.7 | 1.5 | 0.7 | 1.5 | 3.3 |
| $SiO_2$ | 12 | 5 | 6.9 | 3.5 | 4.4 | 3.1 | 4.4 | 4.4 | 4.4 | 3.0 | 5.8 |
| $Na_2O$ | 0.8 | 0.5 | 0.3 | 0.2 | 0.3 | 0.2 | 0.3 | 0.3 | 0.3 | 0.3 | 0.6 |
| $P_2O_5$ | — | 1.5 | 0.1 | 0.2 | — | — | 0.05 | 0.05 | — | — | — |
| $B_2O_3$ | — | — | — | — | 0.1 | 0.1 | 0.1 | 0.1 | — | — | — |
| $Fe_2O_3 + TiO_2$ | At most 0.1 | At most 0.5 | At most 0.3 | At most 0.3 | At most 0.3 | At most 0.3 | At most 0.3 | At most 0.3 | At most 0.3 | At most 0.3 | At most 0.3 |
| $MgO + CaO$ | At most 0.1 | At most 0.5 | At most 0.1 | At most 0.1 | At most 0.1 | At most 0.1 | At most 0.1 | At most 0.1 | At most 0.1 | At most 0.1 | At most 0.1 |
| Rare earth oxides | — | 0.9 | — | — | — | — | — | — | — | — | — |
| Bulk density of cast product | 4.00 | 5.14 | 5.18 | 5.33 | 5.35 | 5.37 | 5.35 | 5.32 | 5.36 | 5.35 | 5.10 |
| Compression strength (kg/cm$^2$) | 3500 | — | 4000 | — | — | — | — | — | — | — | — |
| Cracks in cast product | Nil | Present | Nil | Nil | Nil | Nil | Nil | Nil | Nil | Present | Present |
| After thermal cycle test | | | | | | | | | | | |
| Volume expansion (%) | — | — | 20 | 13 | 12 | 10 | 12 | 10 | 7 | 5 | 6 |
| Cracking | — | — | Present | Present | Present | Present | Present | Present | Present | Present | Present |
| Against sheet glass meltage | | | | | | | | | | | |
| Corrosion resistance index*[1] | 1.0 | 1.25 | 2.18 | — | 2.00 | — | — | 2.15 | — | 2.7 | 1.80 |
| Formation of stones*[2] | Present | Present | Nil | Nil | Nil | Nil | Nil | Nil | Nil | Nil | Nil |
| Coloring of glass*[3] | Nil | Present | Nil | Nil | Nil | Nil | Nil | Nil | Nil | Nil | Nil |

*[1] For the determination of the corrosion resistance index, a test specimen of 15 mm × 15 mm × 50 mm was cut out from the cast product and hanged in a platinum crucible containing molten glass at 1500° C. for 48 hours, whereby the volume corrosion amount was measured, and the corrosion resistance index = the corrosion amount (mm$^3$) of No. 11 test specimen/corrosion amount (mm$^3$) of the test specimen, was obtained.
*[2] Presence or absence of stones in the glass remained in the platinum crucible in the test for the corrosion resistance index *[1] was examined.
*[3] Presence or absence of coloring of the glass remained in the platinum crucible in the test for the corrosion resistance index *[1] was examined.

As compared with the conventional high zirconia fused cast refractory, the high zirconia fused cast refractory of the present invention is excellent in the corrosion resistance and has no substantial tendency for partial falling off during the temperature rise and substantially superior thermal cycle resistance. Accordingly, when used for a furnace for melting glass, the durability and reliability of the furnace can be improved, and at the same time cracks formed in the refractory can be minimized. Accordingly, it is possible to avoid the possibility that fine particles of refractory are freed into the glass meltage from the cracked portions of the refractory. Further, the high zirconia fused cast refractory may frequently be used at the portion of the glass furnace where corrosion is particularly remarkable, or it is useful for a furnace for melting a glass composition having a high melting point, or for a glass melting furnace for producing fine glass products such as electronic substrates or display substrates. It has an effect to improve the quality and yield of such final products. Thus, its merit for industrial application is substantial.

We claim:

1. A high zirconia fused cast refractory which comprises, as chemical components of the refractory, from 90 to 95% by weight of $ZrO_2$, from 3.5 to 7% by weight of $SiO_2$ and from 1.3 to 3% by weight of $Al_2O_3$ and at most 0.02% by weight contain any one of $P_2O_5$, $B_2O_3$ and CuO.

2. The high zirconia fused cast refractory according to claim 1, which comprises, as chemical components of the refractory, from 90 to 95% by weight of $ZrO_2$, from 3.5 to 6% by weight of $SiO_2$ and from 1.3 to 2.5% by weight of $Al_2O_3$.

3. A lining for a glass melting furnace comprising the composition of claim 1.

4. A lining for a glass melting furnace comprising the composition of claim 2.

* * * * *